Patented Mar. 18, 1952

2,589,377

UNITED STATES PATENT OFFICE 2,589,377

HYDROXYPHENYL-CINNAMIC NITRILES AND PROCESS

Hans Henecka, Wuppertal-Elberfeld, Germany, assignor to Schenley Laboratories, Inc., New York, N. Y., a corporation of Delaware No Drawing. Application November 17, 1949, Serial No. 128,015. In Germany October 5, 1948

9 Claims. (Cl. 260—465)

This invention relates to a novel class of compounds, the β-hydroxyphenyl-cinnamic acid nitriles.

I have found that β-hydroxyphenyl-cinnamic acid nitriles or their nuclear substitution products can readily be obtained in a good yield by reacting a beta - (methoxymethyloxy - phenyl) - beta-phenyl-hydracrylic acid nitrile—obtainable by condensation of the methoxymethylether of a hydroxybenzophenone with acetonitrile or its mono-substitution products—with acids in the presence of a formaldehyde binding agent. In an unexpected manner saponification of the methoxy-methyl ether group and simultaneous dehydration occurs, β-hydroxyphenyl-cinnamic acid nitrile being formed. The formaldehyde set free by the saponification of the methoxy-methyloxy, group can be chemically reacted with the formaldehyde-binding agent, for instance, phenol or sulfurylamide, thus facilitating completion of the reaction by removal, in effect, of this byproduct. A small quantity of dilute mineral acid is preferably used as an acid catalyst while the preferred solvent is glacial acetic acid.

The new process is applicable to ethers of o-hydroxybenzophenone, as well as to ethers of m- or p-hydroxybenzophenone. Furthermore, the benzene nuclei of the benzophenone may be substituted by alkyl radicals or halogen atoms. In these cases, the correspondingly substituted ethers of β-hydroxy-phenyl-cinnamic acid nitriles can easily be produced.

The product obtained by this process, beta-hydroxyphenyl-cinnamic acid nitril, is an important intermediate for the production of anaesthetics having an activity resembling that of morphine.

The present invention is further illustrated by the following examples:

Example 1

About 100 grams of beta-(o-methoxymethyloxy-phenyl)-beta-phenyl-hydracrylic acid nitrile, having a melting point of 123° C., which may be obtained by condensation of o-methoxymethyloxy-benzophenone with acetonitrile in an ethereal solution in the presence of sodium amide, are dissolved in a mixture of 500 grams of phenol and 500 ccs. of glacial acetic acid and reacted with 20 ccs. of 20 per cent aqueous sulfuric acid at room temperature. After standing for 15 hours the β-o-hydroxyphenyl-cinnamic acid nitrile formed is precipitated in crystals by diluting with three liters of water. By recrystallizing from a mixture of ether and gasoline or from 50 per cent acetic acid fine, bright needles are obtained. These needles have a melting point of 155–157° C. and are easily soluble in dilute caustic soda solution with light yellow coloration. The yield amounts to 65–70 per cent of the theoretical.

Example 2

Instead of phenol used as a formaldehyde-acceptor in Example 1, sulfurylamide may be advantageously employed.

A solution of β-o-methoxymethyloxphenyl-β-phenylhydracrylonitrile and 20 g. of sulfurylamide are left to stand for 15 hours in 1500 ccs. glacial acetic acid to which 40 ccs. of 20 per cent aqueous sulfuric acid have been added. On gradual addition of 2500 ccs. of water β-o-hydroxy-phenyl-cinnamic acid nitrile precipitates in fine crystals of a high degree of purity and in good yield.

In an analogous manner the following derivatives are obtained:

1. β-o-Hydroxy-p-tolyl-cinnamic nitrile of the melting point 126–127° C. from β-(o-methoxymethyloxy - p - tolyl) - β - phenylhydracrylonitrile (melting point 80–82° C.).

2. β - o - Hydroxy - p - tolyl - p' - chloro - cinnamic nitrile of the melting point 148–150° C. from β - (o - methoxymethyloxy - p - tolyl - )- β - p' - chlorophenylhydracrylonitrile (melting point 107–108° C.).

3. β - o - Hydroxy - p - tolyl - p' - methylcinnamic nitrile of the melting point 144–145° C. from β - (o - methoxymethyloxy - p - tolyl) - β - p'-tolylhydracrylonitrile (melting point 144–145° C.).

I claim:

1. As new compounds β-hydroxyphenyl-cinnamic nitriles of the group consisting of beta-ortho - hydroxyphenyl - cinnamic nitrile, beta-ortho-hydroxy-para-tolyl-cinnamic nitrile and beta - ortho - hydroxy - para - tolyl - para-prime-methyl-cinnamic nitrile.

2. As a new compound β-o-hydroxyphenyl-cinnamic nitrile.

3. As a new compound β-o-hydroxy-p-tolyl-cinnamic nitrile.

4. As a new compound β-o-hydroxy-p-tolyl-p'-methyl-cinnamic nitrile.

5. A process of producing β-hydroxyphenyl-cinnamic nitriles which comprises reacting a β - methoxymethyloxy - phenyl - beta - phenyl-hydracrylic nitrile with a dilute aqueous solution of a common mineral acid and while dissolved in a water-miscible, acidic, liquid organic solvent medium, under conditions favoring hydrolysis, whereby the methoxymethyloxy substituent is converted to a hydroxyl substituent.

6. A process of producing β-hydroxyphenylcinnamic nitriles which comprises reacting a β - methoxymethyloxyphenyl - β - phenylhydracrylic nitrile with dilute sulfuric acid under conditions favoring hydrolysis of the methoxymethyloxy substituent to a hydroxyl substituent, in glacial acetic solvent.

7. A process of producing β-hydroxyphenylcinnamic nitriles which comprises reacting a β - methoxymethyloxyphenyl - β - phenylhydracrylic nitrile with dilute sulfuric acid under conditions favoring hydrolysis of the methoxymethyloxy substituent to a hydroxyl substituent, in glacial acetic solvent in the presence of a compound capable of binding formaldehyde.

8. A process of producing β-hydroxyphenylcinnamic nitriles which comprises reacting a β - methoxy - methyl - oxyphenyl - β - phenylhydracrylic nitrile with sulfuric acid in glacial acetic acid in the presence of phenol.

9. A process of producing β-hydroxyphenylcinnamic nitriles which comprises reacting a β - methoxy - methyl - oxyphenyl - β - phenylhydracrylic nitrile with sulfuric acid in glacial acetic acid in the presence of sulfurylamide.

HANS HENECKA.

REFERENCES CITED

The following references are of record in the file of this patent:

Borsche et al., Beilstein (Handbuch, 4th ed.), vol. 10, p. 357 (1927).

Stoermer, Ber. Deut. Chem., vol. 44, pp. 662–663 (1911).